United States Patent [19]

Nattefort

[11] 4,031,810

[45] June 28, 1977

[54] ROTATING SPINDLE AND TOOL UNIT

[75] Inventor: Fritz Nattefort, Leichlingen, Germany

[73] Assignee: The Precise Corporation, Racine, Wis.

[22] Filed: July 26, 1976

[21] Appl. No.: 708,610

[30] Foreign Application Priority Data

Oct. 3, 1975   Germany .......................... 2544558

[52] U.S. Cl. ................................ 90/11 A; 90/11 D;
408/239 R
[51] Int. Cl.² ........................................... B23C 5/26
[58] Field of Search ......... 90/11 D, 11 A; 408/239,
408/239 A; 279/1 B, 1 ME, 1 SG, 24, 30, 79,
81; 29/568

[56] References Cited

UNITED STATES PATENTS

| | | | |
|---|---|---|---|
| 2,037,307 | 4/1936 | Bowman | 279/24 X |
| 3,586,343 | 6/1971 | Reed | 90/11 A |
| 3,804,426 | 4/1974 | Mickas | 90/11 D |

FOREIGN PATENTS OR APPLICATIONS 2,101,894   1/1971   Germany ........................... 90/11 D Primary Examiner—Leonidas Vlachos
Attorney, Agent, or Firm—James E. Nilles

[57] ABSTRACT

A cutting or drilling spindle and a tool unit supportable within the spindle for rotation with the spindle wherein the tool unit is provided with radially extending protrusions which can be received within corresponding inner radially spaced recesses within the spindle. The radial protrusions of the tool unit comprise balls support adjacent the exterior surface of the axial neck of the tool unit by a cage and which operate in such a way that during axial insertion of the tool unit into the spindle and locking, the radially outwardly extending portions of the balls will be engaged in the spindle's recesses. The balls are relatively movable such that if they are not properly aligned with the recesses when the tool unit is inserted into the spindle, the balls facilitate correction so that the protrusions of the tool unit will match the indentations of the spindle. The balls of the tool unit are also arranged to move within recessed pockets in the axial neck of the tool unit and are forced radially outwardly away from the axis of the axial neck into the recesses when there is relative rotation of the tool unit and spindle.

9 Claims, 11 Drawing Figures

ROTATING SPINDLE AND TOOL UNIT

BACKGROUND OF THE INVENTION

The invention deals with a chucking means or tool unit which fits into a co-axially rotating spindle that has a conical bore co-axial to the rotational axis of the spindle. The tool unit is to be inserted into the conical bore of the spindle and firmly secured therein.

Such tool units have been known in tool machinery for a long time. They hold chucking cones whose conal angles either are inside or outside. In the first case, e.g., in so-called Morse tapers, it is sufficient to insert the tool with its conical end into the corresponding inner conical surface of the spindle in order to achieve a precise and tight connection. To achieve disconnection, special loosening tools are needed, such as wedges that have to be pushed in laterally. In other cases, and generally speaking, whenever vertical wedges are used, the tightening of a conal connection is achieved by means of tightening screws.

U.S. Pat. No. 3,651,739 issued Mar. 28, 1972 to Wolf shows an example of this kind of chucking device wherein the tool unit has an axial backward neck for accepting the cone connection. To take out the spindle laterally, it is provided with a box that has a number of slots in various places which correspond to the tongues of the indentations of the tool unit. These boxes also have indentations on the outside which fit into the box when pulled in laterally. The tongues of the boxes are thus pressed inside and catch the indentations of the tongue behind the neck of the unit in order to grasp it, to pull it into the lateral opening, and to tighten it inside.

The invention also deals particularly with chucking devices for special tool units, namely the so-called high frequency spindles. These spindles are small machines which have high-speed motors, are highly precise, and they usually are used as grinding, cutting, or drilling units. Basically, they have cylindrical housings of about 40 to 80 mm circumference. Oftentimes several such spindles are put together in one machine, thus forming drilling machines, e.g., for the purpose of drilling sheet bars in the clock industry or for drilling printed circuit boards.

Because of the smallness of these units, the chucking of the tools presents difficulties. Self-retarding cone connections do not stay together because of the small size of these cones. This is even the case when an additional screw attachment is considered for use. The activation of such a screw attachment requires more time during which the unit or even a larger number of units combined in one machine can not continue to function. Therefore, attempts have been made, following a suggestion which had not directly to do with this particular technique, to utilize a polygonal turning shaft at one end of the tool unit; this shaft was to correspond to an inner polygonal turning bore inside the spindle to assure reliability. This method works as long as the tools are put in manually, and as long as the exact position can be detected by checking, so that the corners of the polygonal turning shafts do not get into each other's way and can get inserted this way.

The trend in working with such machines using high frequency spindles is, however, to automate the tool change as much s possible. Such a tool change can be a necessity not only in regard to the tools' wear, but also in cases where, e.g., a machine has to deliver drillings of various diameter sizes. It is desirable in these cases that the machine first completes the drillings of one kind, then is taken to the tool magazine where the tools are changed automatically, and then continues the other drillings with the new tools.

The change of tools is done by dropping the spindle, taking out the tool unit, and grasping the new tool unit from above. In the automatic execution of these steps, it often happens that difficulties arise in connection with the putting together of the polygonal turning shafts, for example, when the shafts are misaligned and can not be brought together.

SUMMARY OF THE INVENTION

The present invention provides a tool unit and a cutting or drilling spindle which overcome the drawbacks of the prior art mechanisms and wherein the neck of the tool unit is provided with radially extending protrusions which can be received within corresponding radially spaced recesses within the spindle. The radial protrusions of the tool unit operate in such a way that during axial insertion of the tool unit into the spindle and locking, the protrusions of the tool unit will be engaged in the spindle's recesses, and if the position of the protrusions and recesses is such that they are not properly aligned when the tool unit is inserted into the spindle, an automatic correction will take place so that the protrusions of the tool unit will match the recesses of the spindle.

The radial protrusions of the tool unit comprise balls which are shiftably secured to the exterior surface of the axial neck of the tool unit by a cage. Since the balls have a convex outer surface which is received against the surface of the recesses, the balls can be easily received within the recesses. Furthermore, they assure perfect locking security for the inserted tool unit as will be described.

The spindle's recesses for receiving the balls are in their preferred form parallel to the longitudinal axis of the spindle and have a generally triangular cross-sectional shape.

Another aspect of the invention is that the balls which comprise the protrusions of the axial neck of the tool unit are arranged to move within recessed pockets in the axial neck of the tool unit. The recessed pockets include supporting surfaces which are generally flat and are positioned around the circumference of the neck. The balls supported by the supporting surfaces thus move away from or toward the axis of the axial neck as they move along the supporting surface.

Since the balls are movable within the recessed pocket, if the spindle does not meet the tool unit correctly, the balls can move to permit the tool unit to be inserted into the spindle. Furthermore, since the motion of the balls is such that the distance between the balls and the axis varies in the event of movement of the balls within the recessed pockets, the balls can be moved outwardly upon rotation of the tool unit within the spindle causing the balls to move into the spindle's recesses. This provides locking engagement between the tool unit and the spindle merely by rotating the tool unit with respect to the spindle.

Furthermore, there is an advantage in providing a cage for the balls surrounding the neck and restraining the balls within the recessed pockets. The cage includes a plurality of bores for receiving the balls, these bores being smaller than the balls' diameter but permitting play of the balls within the bores. This way, the balls cannot fall out of the bores and the cage, but on the other hand, there is limited play of the balls within the bores permitting rotation of the cage around the axial neck wherein the balls are moved with respect to the recessed pockets thereby causing the balls to move radially outwardly with respect to the axis of the neck so that the balls will engage the indentations in the spindle.

Further advantages of the present invention will be seen in the following description of a preferred embodiment of the invention.

DESCRIPTION OF THE PREFERRED EMBODIMENT

Figure 1:
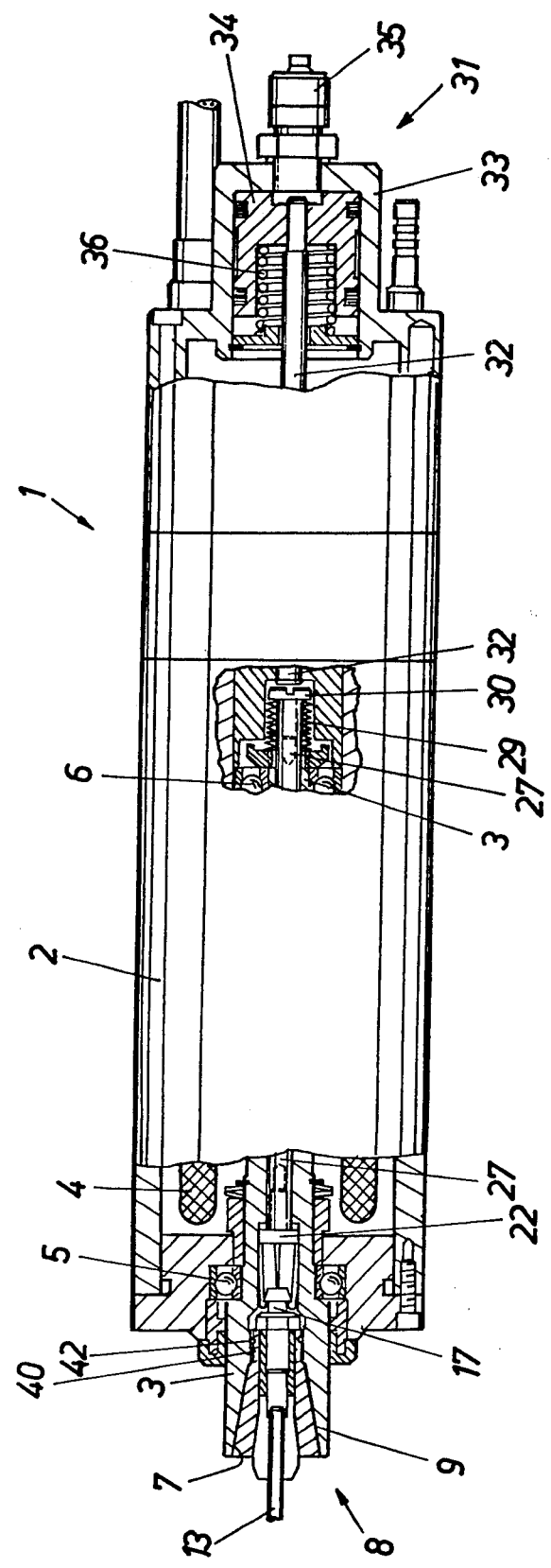
FIG. 1 is a side elevation view of a high frequency spindle partially in cross section.

A high frequency spindle mechanism is shown in FIG. 1 as element 1 and includes a cylindrical housing 2 which surrounds a spindle 3 which is run by a high frequency motor having a winding 4 at a very high number of revolutions, for example up to 60,000 rpm. The spindle 3 is supported at its opposite ends by ball bearings 5 and 6 and has an inner conical bore 7 for receiving a tool unit 8 which in turn has an outer conical surface 9.

Figure 2:
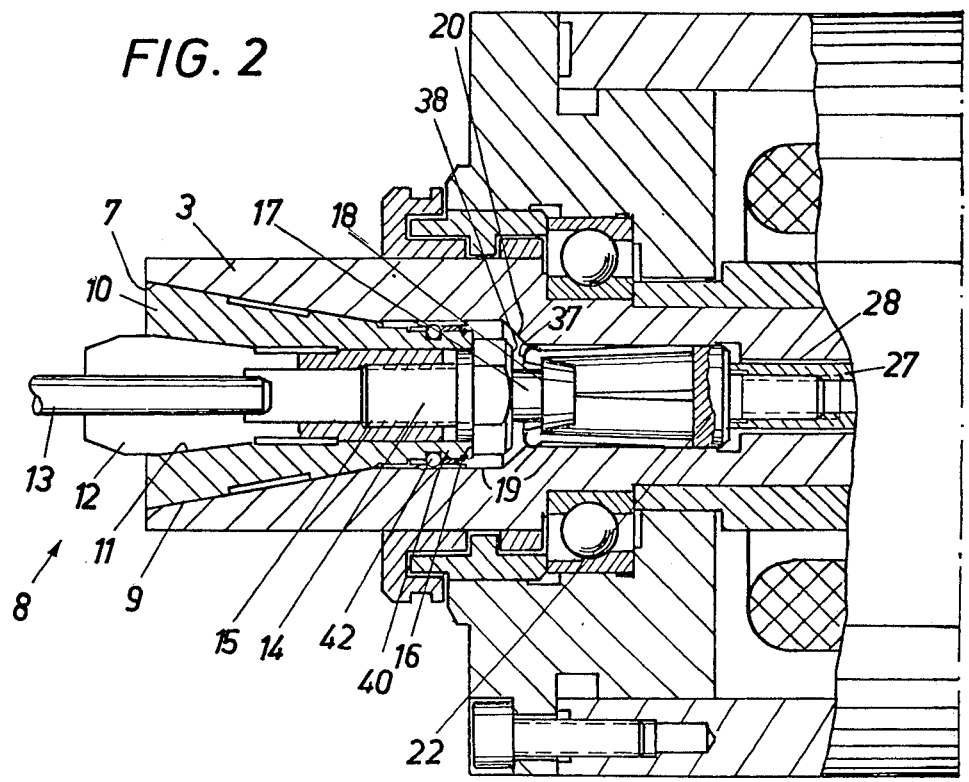
FIGS. 2 and 3 are enlarged cross-sectional views of the end of the high frequency spindle shown in FIG. 1 and showing a tool unit received within a spindle of the high frequency spindle.
Figure 3:
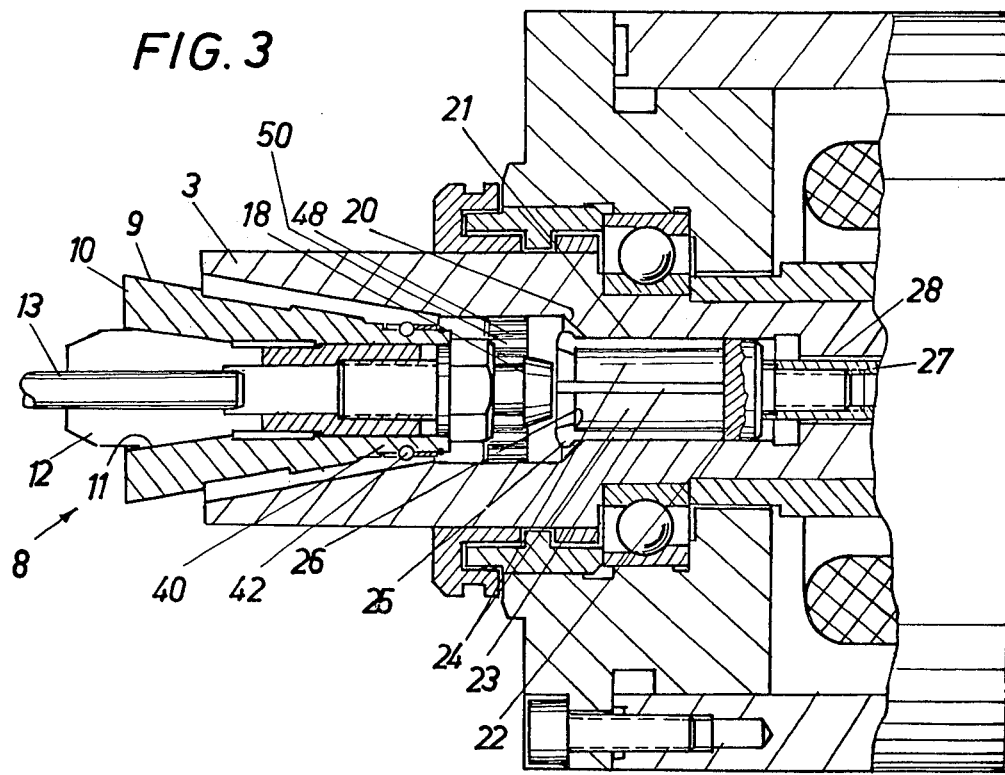
Figure 4:
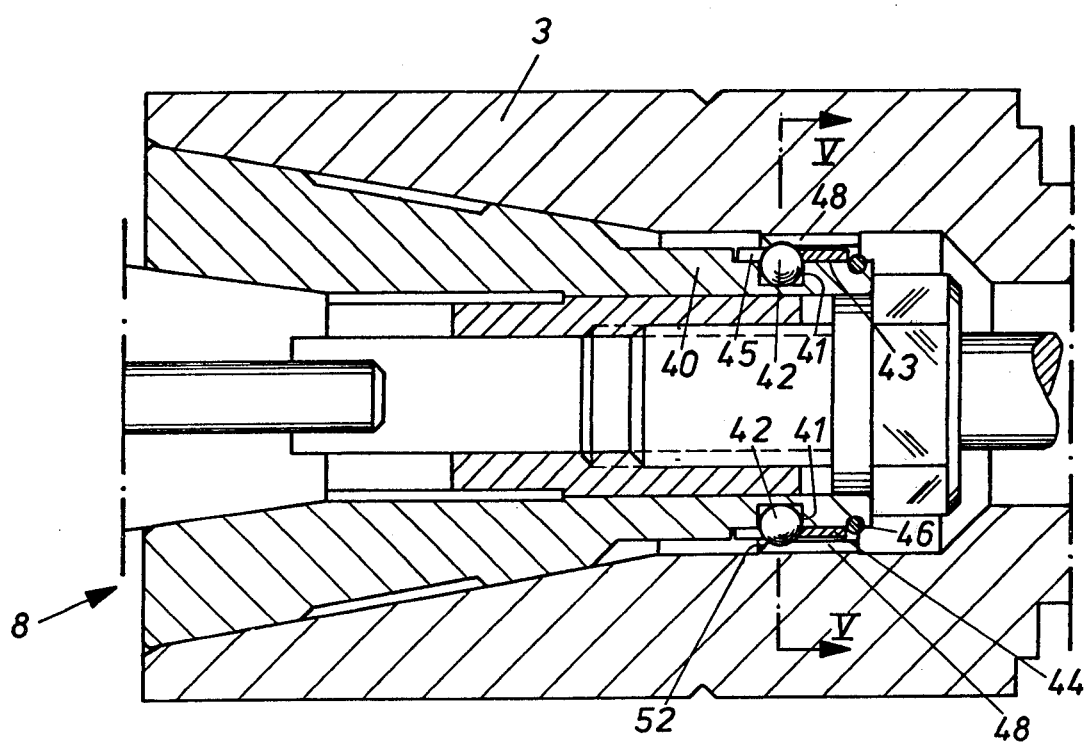
FIG. 4 is an enlarged view of portions of the tool unit and spindle shown in FIG. 2.

The tool unit 8 is shown in FIGS. 2 and 3 and includes an intermediate sleeve 10 having the outer conical surface 9 and also includes an inner conical bore 11. A draw-in collet 12 is inserted into the conical bore 11 and receives a tool 13 in locked engagement. The tool 13 is shown only as a cylindrical shaft, but it can be the shaft of a drill, cutter, etc. The draw-in collet 12 is activated by a tightening screw 14 which is threadably received in a screw thread 15 at the end of the draw-in collet 12 and abuts against the end 16 of the intermediate sleeve 10. At the end opposite the tool 13 and pointing towards the inside of the spindle 3, the tightening screw 14 includes an integral neck 17 having a radial flange or protrusion 18 that forms the lower side of a head formed, in longitudinal section, quadrilaterally.

The tool 13 can be inserted into the tool unit 8 before the tool unit 8 is inserted into the cutting or drilling spindle. In order to provide means for accepting tools 13 of different diameters, different draw-in collets 12 can be inserted into the intermediate sleeve 10.

For locking safety, a neck 40 is provided at the end of tool unit 8 adjacent the end of the intermediate sleeve 10. This neck 40 is provided, in the example shown, with three recessed pockets 41 in longitudinal alignment with respect to the axis of the tool unit 8 and in spaced relationship around its periphery at the end of the intermediate sleeve 10. Each of the three recessed pockets 41 support a ball 42 which can move longitudinally within the recessed pockets 41. The neck 40 generally includes a cylindrical outer surface 43 interrupted by the recessed pockets 41 and surrounded by a cylindrical cage or box 44. The cage 44 has a plurality of open longitudinally extending slots which correspond to the number of balls 42 and the cage has a plurality of bores or holes 45 for receiving the balls therein. The cage 44 is secured to the neck 40 by means of a retaining ring 46 surrounding the end of the neck 40 and closely adjacent to the cage 44.

Figure 5:
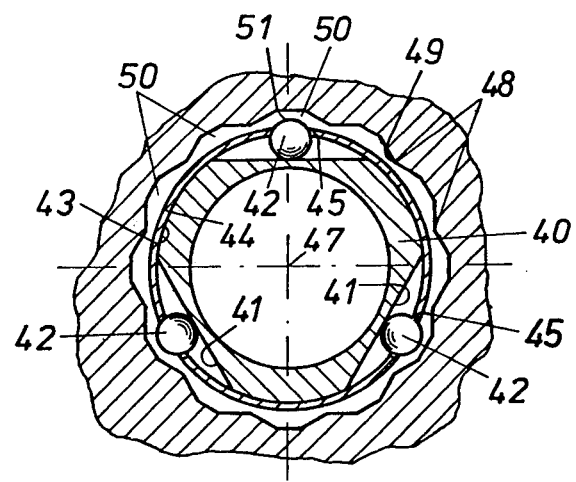
FIG. 5 is a cross-sectional view taken along the line 5—5 in FIG. 4.

When, in this example, the three balls 42 are in the position shown in FIG. 5, they are positioned at their closest relationship to the axis 47 of the tool unit 8. As soon as they move out of this position in any direction, the radial distance from the axis 47 is enlarged. Such movement of the three balls 42 is caused by rotation of the cage 44 around the cylindrical surface of the neck 40.

The bores or holes 45 receiving the balls therein comprise openings smaller than the diameter of the balls and consequently, the balls will not pass through them. On the other hand, the bores are large enough with respect to the balls 42, as shown in FIG. 5, to leave room for some play between the surface of the balls 42 and the edges of the bores 45. As a result, the cage 44 can be turned with respect to the neck 40 to some degree with the balls 42 in the pockets 41 having a rolling movement and moving radially outwardly from the axis 47. At that portion of the spindle 3 adjacent to the balls 42, the spindle 3 has a plurality of splines or elongated protrusions 48 extending toward and parallel to the axis 47 of the spindle. The protrusions 48 each have a cross section which is shaped as a triangle, one corner 49 of which points toward the axis 47. The elongated protrusions define recesses 50 between them, each of these recesses 50 for receiving a portion of one of the balls 42.

When the balls 42 are in the position closest to the axis 47, as shown in FIG. 5, the surface 51 of the balls 42 received in the recesses 50 have a greater radial outward distance from the axis 47 of the spindle 3 than the points 49 of the protrusions 48 such that the protrusions 48 prevent relative rotation between the tool unit 8 and the spindle 3. When the tool unit 8 is thus prevented from rotating within the spindle 3 because the balls 42 abut the protrusions 48, the balls 42 move within slot 41 circumferentially with respect to the neck 40 when viewed as in FIG. 5. The radial distance between the balls 42 and the axis 47 is thus enlarged and they penetrate deeper into the recesses 50 so that locking occurs.

Since the protrusions 48 have triangular cross sections and, therefore, have a narrow edge 49 in opposed relationship to the axis 47 and since the balls have a convex configuration, the balls will be pushed to either the right or to the left when the tool unit 8 is moved axially into the spindle 3 from the position shown in FIG. 3 to the position shown in FIG. 2. Thus, when the tool unit 8 is put into the spindle 3, it is not possible that an edge of the tool unit will abut an edge of the spindle to prevent engagement of the tool unit 8 and the spindle 3 and the balls 42 will not be prevented from moving into the recesses 50. The locking security achieved by having the protrusions 48 grasp the balls 42 is thus achieved by mere axial insertion of the tool unit 8. To further facilitate smooth insertion of the tool unit 8 and the spindle 3, the protrusions 48 have bevelled leading edges 52 at their sides facing the tool unit 8.

In the example presented, three balls 42 and twelve elongated protrusions 48 are shown. These numbers are not binding, but present a compromise resulting from the dimensions of the various elements. With three recessed pockets 41, the wall strength of neck 40 is not unduly weakened and there is sufficient lift provided for the balls 42 when they are moved. With twelve protrusions 48, only minor turning is needed to move the balls 42 into the recesses 50. The protrusions 48 which because of their pushing purpose have a relatively large nose angle (about 150°) and are relatively flat in order to avoid taking up too much radial space but they still extend radially inwardly sufficiently to guarantee faultless locking of the balls 42 and absolute locking security.

Inside the inner cone or conical surface 7, the spindle 3 has a longitudinal empty space 19 which includes a shoulder 20. Shoulder 20, in the example, forms a bevelled flank leading away from the tool 13. A drill hole 21 which is the smaller part of the empty space 19 contains a cylindrical sleeve 22 having longitudinal slots 23 at its end which is adjacent to the tool unit 8. The sleeve 22 thus includes a plurality of tongues 24. The ends of the tongues lie approximately adjacent to the shoulder 20 and include cams 25 at their outer surfaces and hook-like protrusions 26 on their radially inward surfaces. When the sleeve 22 is pushed axially outwardly toward the tool 13, the tongues expand radially outwardly and the cams 25 protrude radially outside the drill hole 21 and extend into the empty space 19 adjacent the shoulder 20 (FIG. 3). The hook-like protrusions 26 are expanded when the cylindrical sleeve 22 is in this position such that the radial flange 18 at the end of the neck 17 of the tool unit 8 can be axially slideably positioned between the hook-like protrusions 26. As soon as the cylindrical sleeve has been moved to the right as shown in FIG. 2, however, the cams 25 abut the shoulder 20 and press the free ends of the tongues 24 radially together whereby the hook-like protrusions 26 will grasp the radial flange 18. When the cylindrical sleeve 22 is then moved further to the right, the tool unit 8, held by the radial flange 18, is pulled into the inner conical surface 7. When the tool unit 8 is thus completely pulled in, the cylindrical sleeve 22 has moved sufficiently to the right that the cams have moved past the edge of the shoulder 20 and touch the cylindrical inside surface of the drill hole 21. This is important because self-locking is achieved in this manner, and the hook-like protrusions 26 are prevented from sliding off the end of the radial projection.

A draw-bar 27 is attached to the cylindrical sleeve 22 and extends through a central longitudinal bore 28 in the spindle 3 and supports a head screw 30 at the end extending out of the spindle 3. The draw-bar 27 works against a compression spring 29 which in turn bears against the end of the spindle 3 in order to exert pressure to the right (as shown in FIG. 1) on the draw-bar 27 thereby biasing the cylindrical sleeve 22 to the right. The strength of the compression spring 29 corresponds to the necessary chucking power for putting tool unit 8 into the cone connection. Thus, in a normal situation, the tool unit 8 is held in clamped relationship by means of the compression spring 29 and the chucking power is provided exclusively within the spindle arrangement and does not have to be produced outside the rotating spindle.

To disengage the tool unit 8 from the spindle 3, a disengagement unit has been provided which has a press shaft 32 located co-axially within the spindle 3 and having an end for engaging the tool unit 8 but separated from it. The press shaft 32 can be pushed against the head screw 30 by means of a movable piston 34 which is inside a cylinder 33 and adjacent that end of the cutting and drilling spindle assembly 1 which is away from the tool unit 8. The cylinder 33 is provided with air under pressure by a connection 35. When air pressure is applied, the press shaft 32 compresses a spring 29 and pushes the end of the cylindrical sleeve 22 out of the drill hole 21 whereby the tongues 24 open radially and the radial flange 18 of the tool unit is released from the cylindrical sleeve. The tool unit 8 can be changed whereby after insertion of a new tool unit 8 and after releasing pressure in the cylinder 33, the piston 34 is moved by the spring 36 to the right (as shown in FIG. 1), and the press shaft 32 is thereby pulled away from the head screw 30. Spring 29 then pulls the cylindrical sleeve 22 again to the right and locks the new tool unit 8 into the conical surface 7 of spindle 3.

Instead of the pneumtic cylinder 33, press shaft 32 can also be moved by other means, for example, by a switch. The stroke of piston 34, the press capacity of spring 29, the distance of the radial flange 18 from the back of the tool unit 8, and the distance of the hook-like protrusions 26 from the ends 37 of the tongues 24 are designed and correlated with respect to each other in such a way that the cams 25, when pistons 34 are fully extended, get disengaged from shoulder 20 and the ends 37 of the tongues 24 touch the rear side 38 of the tool unit 8 in order to release the tool unit 8 from the conical connection.

I claim:
1. In combination:
    a spindle rotatable about a longitudinal axis and for use in supporting a tool unit for rotation about said longitudinal axis, said spindle having an end including a cavity therein co-axial with said axis, said cavity including a surface having a plurality of circumferentially spaced recesses; and
    a tool unit for supporting a tool and axially receivable within said cavity for rotation about said longitudinal axis with said spindle, said tool unit including a neck portion having a plurality of radially outwardly projecting balls spaced apart around its circumference, said outwardly projecting balls being radially shiftable and receivable within said recesses when said tool unit is received in said cavity, and for shifting said balls radially outwardly upon initial relative rotational motion between said tool unit and said spindle for preventing further relative rotation of said tool unit and said spindle and providing a rotational driving connection therebetween.

2. The apparatus set forth in claim 1 further including a cage surrounding said balls and said neck portion and for restraining said balls against said neck, and wherein said neck includes recessed pockets in spaced apart relationship around its circumference, said pockets each receiving one of said balls.

3. The apparatus set forth in claim 1 wherein said cavity includes a conical portion and a generally cylindrical portion adjacent said conical portion, and wherein said tool unit includes a cone adjacent said neck and receivable within said conical portion of said cavity.

4. The apparatus set forth in claim 1 wherein said tool unit includes a cone adjacent and integral with said neck, said neck including spaced apart recessed pockets and wherein said balls are shiftably supported in said recessed pockets.

5. In combination:
a spindle rotatable about a longitudinal axis for use in supporting a tool unit for rotation about said longitudinal axis, said spindle having an end including a cavity therein co-axial with said axis, said cavity including a surface having a plurality of circumferentially spaced apart recesses; and
a tool unit for supporting a tool and receivable within said cavity for rotation about said longitudinal axis with said spindle, said tool unit including a generally cylindrical neck portion having spaced apart pockets, a plurality of balls, one of said balls shiftably supported in one of said pockets, said balls being receivable in said recesses when said tool unit is received in said cavity, and means for shifting said balls radially outwardly upon initial relative rotation between said tool unit and said spindle for preventing further relative rotation of said tool unit and said spindle.

6. The apparatus set forth in claim 5 further including a generally cylindrical cage surrounding said neck portion and rotatable around said neck portion, said cage including a plurality of holes therein, each of said holes for receiving one of said balls.

7. The apparatus set forth in claim 5 wherein said pockets each include a supporting surface for supporting said balls, said surface generally defining a plane normal to a radially extending line through said axis.

8. The apparatus set forth in claim 6 wherein said pockets each include a supporting surface for supporting said balls, said surface generally defining a plane normal to a radially extending line through said axis.

9. In combination:
a spindle rotatable about a longitudinal axis for use in supporting a tool unit for rotation about said longitudinal axis, said spindle having an end including a cavity therein co-axial with said axis, said cavity including a conical portion adjacent said end and a generally cylindrical portion adjacent said conical portion, said cylindrical portion including a surface having a plurality of circumferentially spaced apart recesses; and
a tool unit for supporting a tool and receivable within said cavity for totation about said longitudinal axis with said spindle, said tool unit including a cone receivable within said conical portion of said cavity, a generally cylindrical neck portion integrally connected adjacent said cone and receivable within said generally cylindrical portion of said cavity, said neck portion having a generally cylindrical surface and having spaced apart pockets, a generally cylindrical cage surrounding said neck portion, said cage including a plurality of spaced apart holes therein, a plurality of balls, one of said balls shiftably supported within one of said pockets and including a portion projecting through one of said holes in said cage, said balls being receivable in said recesses when said tool unit is received in said cavity, and means for shifting said balls radially outwardly upon relative rotation between said tool unit and said spindle so as to form a driving connection between said spindle and tool unit.

* * * * *